Patented Jan. 28, 1941

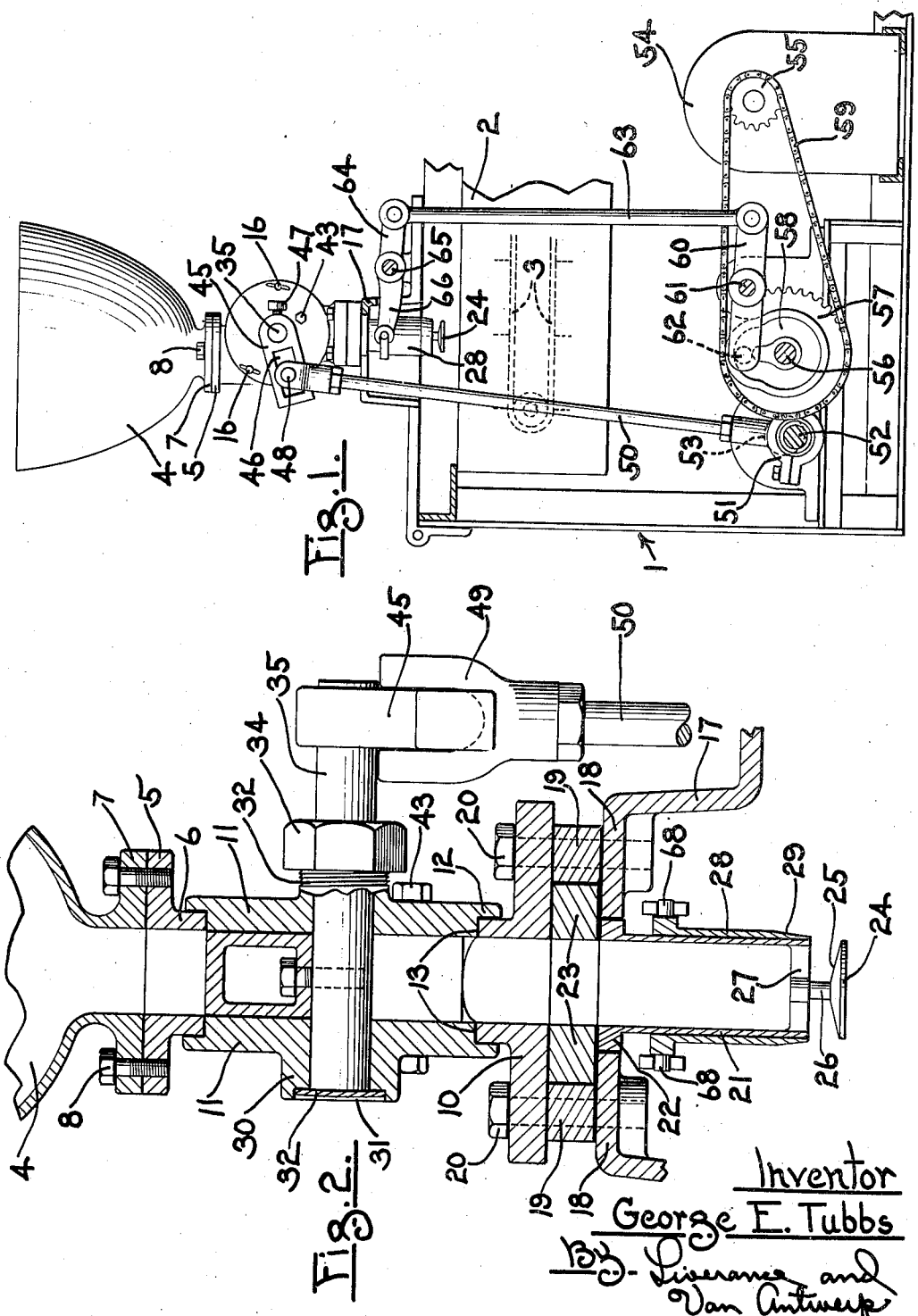

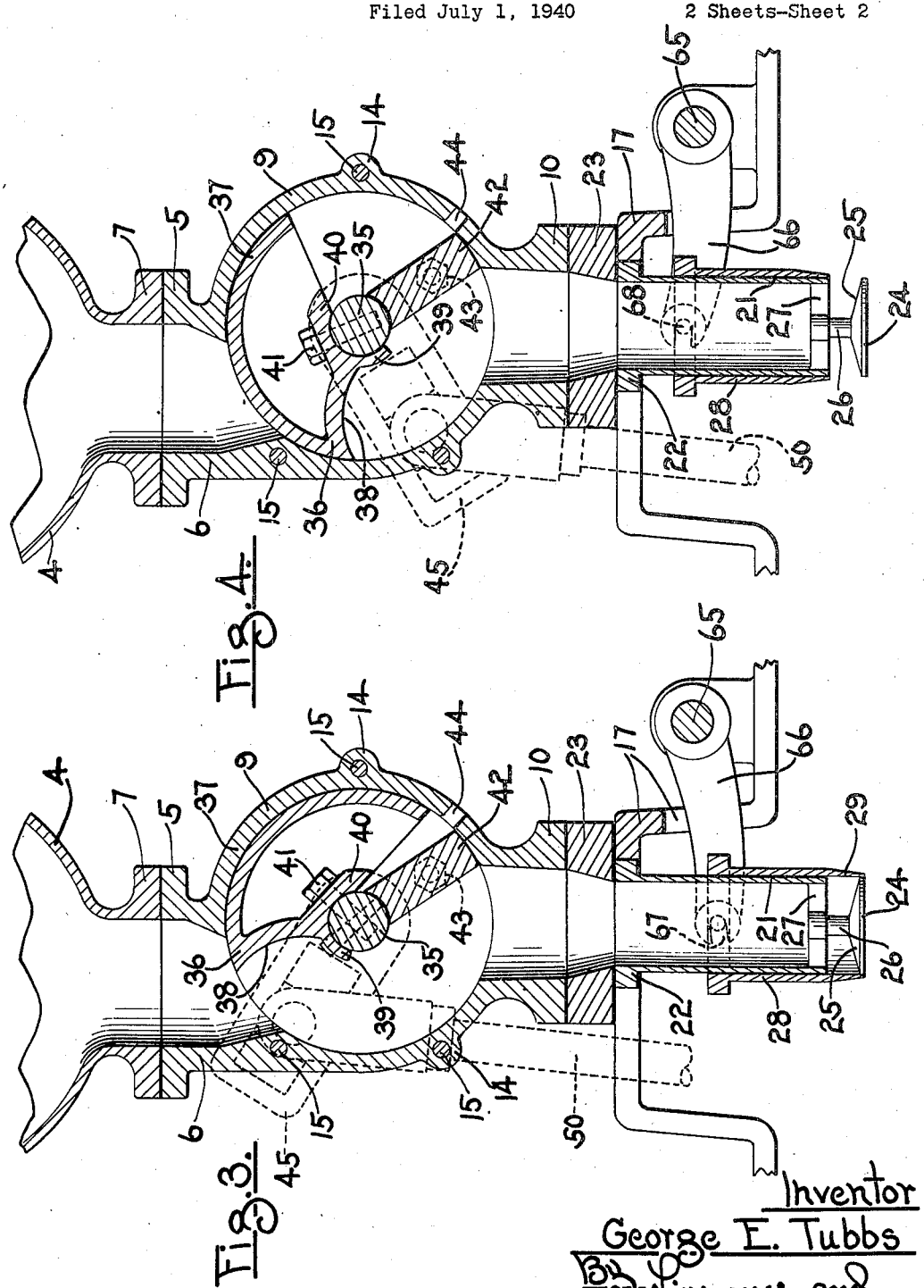

2,230,094

UNITED STATES PATENT OFFICE 2,230,094

DOUGH FEEDING DEVICE

George E. Tubbs, Hillsdale, Mich., assignor to F. W. Stock & Sons, Hillsdale, Mich., a corporation of Michigan Application July 1, 1940, Serial No. 343,309

6 Claims. (Cl. 107—14)

This invention relates in general to a device for ejecting or extruding in predetermined amounts a relatively plastic material, and more particularly has regard to a novel device for ejecting dough in a doughnut machine and for forming the doughnuts prior to their placement on the conveyor in the grease bath.

Heretofore in other machines of this nature it has been common practice to provide above the hopper or reservoir a compressed air mechanism for forcing the dough through the extruding passageway and around the centrally disposed plate at the bottom thereof which forms the hole in the doughnut. This method is unsatisfactory because it necessitates the complete removal of the upper part of the compressed air mechanism in order to again fill the reservoir with dough thereby utilizing an unnecessary amount of time which could otherwise be consumed in continuously making doughnuts if this were not necessary.

Another form which is sometimes used in machines of this nature in the common screw-feeding device, but this mechanical handling of the dough is injurious thereto and tends to lower the quality of the resulting product.

The novel means which I have devised overcomes the objections to the above described machines inasmuch as use is made of an oscillating rotor or plunger to create a vacuum in the housing immediately below the reservoir to thereby suck downwardly an amount of dough sufficient for a single doughnut.

While this is the primary object of the invention, it is a further object to so construct the various parts so that the plate at the bottom of the ejecting passageway around which the dough flows may cooperate with the cutting device which cuts the dough therefrom to form the hole in the doughnut to thereby act as a valve and is operated in timed relation with the oscillating rotor so that the valve remains closed during the upward movement of the rotor to thereby create a vacuum and is opened momentarily to permit the cutter to perform its prime function.

Another object of the invention is the construction of the rotary plunger so that it will open the passageway between the reservoir and the housing on its upward movement and will close same on its downward movement to thereby permit a predetermined amount of dough to be received within the housing. Means have also been provided to vary the distance through which the rotor moves to thereby regulate the amount of dough ejected.

Other objects and purposes of the invention will appear more fully as the description proceeds.

To the accomplishment of the foregoing and related ends said invention, then, consists of the means hereinafter fully described and particularly pointed out in the claims. The annexed drawings and following description set forth in detail certain means for carrying out my invention said means constituting however, but one of various ways in which the principle of the invention may be employed.

In said annexed drawings, wherein like reference numerals refer to like parts throughout the various views.

Fig. 1 is an end elevation of the device embodying my invention.

Fig. 2 is an enlarged sectional view through the said device of Fig. 1 looking toward the right.

Fig. 3 is a vertical section similar to Fig. 2 but taken at right angles thereto and showing the oscillating rotor or plunger in its upper position, and Fig. 4 is a sectional view similar to Fig. 3 but showing the rotor in substantially its lowest position.

The supporting standard or table to which my device is secured may be of any desired conventional form and the support itself is indicated generally by the numeral 1. Near the top thereof and extending in substantially a horizontal plane is the usual tank 2 which contains an amount of grease together with the usual conveyor 3 into which the doughnut dough is dropped prior to its being fried.

At the top of the structure a hopper or reservoir 4 is provided which has an open lower end. Immediately therebelow is a plate or support 5 which extends downwardly as at 6 and upon which plate the outwardly flanged lower end 7 of the reservoir rests. These parts may then be secured together by means such as the bolts 8. The opening in the support 5 is of substantially the same size and is brought into alinement with the opening in the bottom of the reservoir.

Below the supporting means for the reservoir a substantially circular hollow housing member 9 is located which is cast integrally with the plate 5 and terminates at its lower end with another integrally cast plate 10. The housing is then completed by the side plates 11 at each side thereof and which are annularly recessed as at 12 whereby the resulting inwardly extending portions 13 thereof are received within the housing. Each side of the housing 9 and each side plate is provided with a plurality of annularly spaced apart extensions 14 with openings therein for the reception of the threaded rods 15 which then have the wing nuts 16 at the outer ends thereof to thereby secure the side plates to the housing.

Below this casting which includes the main housing 9 and the upper and lower plates 5 and 10 thereon, is a supporting structure 17 of the form shown in Fig. 1 and which is forked to provide the spaced apart sides 18. Immediately above each of the sides 18 a spacer bar 19 is located upon which rests the lower plate 10 of the housing casting. The plate 10, the spacers 19 and each side 18 of the support are provided with openings for the reception of the bolts 20 which thereby secure the various parts together.

The ejecting tube 21 is flanged outwardly at its upper edge as at 22 and has secured to the top thereof a plate 23 which is of substantially the same thickness as the spacing blocks 19 and is adapted to fit in between said spacers at its edges and between the plate 10 and the sides 18 of the forked support at its upper and lower sides respectively, thereby affording a support for the ejecting tube 21.

It is to be noted throughout that the sides 11 of the housing are spaced apart a distance to form an opening therein of substantially the same width as the openings thereabove in the reservoir and the upper plate 5 of the housing. Also, the lower plate 10, the ejecting tube 21 and the plate 23 thereon each is provided with a central opening of substantially the same size as those above described with respect to the other parts of the device all of which are in vertical alinement with each other.

At the bottom of the ejecting tube 21 a substantially circular plate 24 is provided which has an upwardly sloped upper surface 25. The outside diameter of the plate 24 is the same as the outside diameter of the ejecting tube 21 and is spaced a distance downwardly therefrom by means of a centrally disposed upwardly extending rod 26, which in turn is secured by means of the bar 27 to the inside of the lower end of the ejecting tube.

Immediately surrounding the ejecting tube is the tubular cutting device 28 which has its lower ends at its outer surface tapered inwardly slightly as at 29. This cutting member 28 is adapted to vertically reciprocate.

When an amount of dough is permitted to pass outwardly through the bottom of the ejecting tube 21 and flows over and outwardly from the plate 24, the cutter 28 is then lowered and cuts the dough from around the plate permitting it to drop downwardly onto the conveyor 3 with the hole therein substantially the same size as the diameter of the plate 24. Since the cutter is to have a rather snug fit about the ejecting tube 21, and since the plate 24 is centrally disposed thereof and is of the same diameter as the outside diameter thereof, the cutter 25 at its lowest position will snugly embrace said plate both during and after its cutting operation and until it is raised to again perform its function.

One of the plates 11 is provided with a hub 30 which has a recess 31 at its outer side within which a plate 32 is placed. Opposite to the hub 30 the other side plate is provided with a threaded extension 33 adapted to receive the packing nut 34. These side plates have an opening extending therethrough in alinement with each other to receive the rock shaft 35 the end of which abuts against the plate 32.

Within the central portion of the housing casting and located between the inward extensions 13 of the side plates 11 is positioned an oscillating rotor or plunger 36 which has an arcuate outer edge portion as at 37 and which bears against the inner curved side of the housing 9. The forward portion of the rotor extends downwardly in the form of an arc to provide the forward face 38. The lower end of the forward face then extends forwardly a short distance as at 39 and rearwardly as at 40 to provide a continuous arcuate portion having the same radius as the rock shaft 35 so that it may be mounted thereon and secured thereto by means of the screw threaded bolt 41. In the lower section of the housing a partition plate 42 is located which extends between the side plates and from a point adjacent the vertical opening in the bottom of the housing radially upwardly to have its upper arcuate end closely adjacent the rock shaft 35. The bolt 43 is then passed through the partition 42 and the two side plates 11 in order to fasten it securely in place. Adjacent the partition and through the housing is provided an opening 44 which is an air vent for the passage of air during the oscillatory rotating motion of the rotor or plunger 36.

An arm 45 which has a slot 46 therein has an opening at one end thereof adapted to receive the outer end of the rock shaft 35 and be secured thereto by means of the bolt 47. Within the slot 46 there is located a bar 48 to which is secured at each end thereof a downwardly extending bifurcated member 49. Any desired means may be utilized for securing the bar 48 at a particular position within the length of the slot 46 and such means may be adjustable so that the bar 48 may be secured at either end of the slot or in any position between these extremes, such adjustment being utilized to vary the distance through which the plunger may be rotated, thereby regulating the amount of dough to be fed each time. A downwardly extending rod 50 is secured to the lower part of the bifurcated member 49 which has at its lower end a clamping device 51 to clamp the lower end of the rod 50 securely to the eccentric 52 on the rotating shaft 53.

The various parts may be driven by any of the usual conventional means but for the purpose of illustration I have shown a motor 54 on the shaft of which is a cog 55. Within the main standard 1 and at the lower part thereof a shaft 56 is located on which is mounted a cog 57 and on the face of which cog is a cam having the track thereof substantially of the configuration shown in Fig. 1 at 58. The chain 59 extends around the two cogs 55 and 57, although any type of reduction gearing can be used instead of the one described. There are also meshing gears on the two shafts 53 and 56 of the same size (not shown) so that these two shafts will rotate at the same speed. This being necessary because the oscillating rotor 36 is operated by rotation of the shaft 53 and the cutting member 28 is reciprocated by rotation of the shaft 56 as will be more fully described hereinafter.

A lever arm 60 is mounted at substantially its mid-point on the shaft 61 for rocking movement. The one end thereof is provided with a cam roller 62 which rides in the cam track 58, while at the other end of the lever 60 a rod 63 is pivotally secured which extends upwardly and is also pivotally secured to the outer end of the upper lever 64 which is similar to the lower one indicated at 60 and is also mounted on a shaft 65 for rocking movement about its mid-point. The remaining portion 66 of the lever 64 is forked at its outer end and terminates in each arm thereof with an inwardly extending slot 67 for the purpose of receiving the pins 68 which extend outwardly at opposed sides of the cutting member 28.

As will be seen from the configuration of the cam track 58, the outer end of the lever 60 is at its highest position as shown in Fig. 1 and remains there but momentarily after which time it immediately is lowered and stays in such lower position for the greater part of a complete revolution of the shaft 56. By means of the connecting parts to the upper lever 64, the outer end 66 will cause an elevation of the cutting member 28 simultaneously with the elevation of the cam roller 62. The raising and lowering then of the cutting member will be dependent upon the raising and lowering of the cam roller 62 in the cam track 58. Figs. 1, 2 and 4 disclose these various parts in the upper position whereas Fig. 3 discloses these parts together with the cutting member in its lowest position where it remains the greater part of the time.

Since the shaft 53 rotates at the same speed as the shaft 56, and since it is mounted eccentrically thereon the rod 50 is continually moving up and down in a substantially vertically reciprocating manner carrying with it the arm 45 and rocking the shaft 35 which has mounted thereon the rotor or plunger 36. The distance through which the rotor may move can be altered by moving the bar 48 within the slot 46 in the usual manner.

The operation of the device is substantially as follows:

After an amount of dough has been placed in the reservoir 4 and the machine started, the cutting member 28 must be in its lower position around the plate 24 so that as the rotor or plunger 36 moves upwardly no air can seep in. The upward movement of the rotor, therefore, will create a vacuum within the housing and as it reaches its uppermost position as shown in Fig. 3, the suction created by such movement will draw into the housing an amount of dough through the opening thereabove. The rotor will then move downwardly thereby forcing the dough which has been received within the housing downwardly through the various passageways and through the ejecting tube 21 and at the same time prevent more dough from entering by closing the opening to the housing from the reservoir. When the rotor has reached substantially or almost its lowest position the cutting member 28 will be momentarily elevated and then immediately lowered to cut from around the plate 24 the dough which has passed outwardly through the end of the ejecting tube and over the plate. The dough thus cut from the plate will be in the form of a ring and will drop downwardly to the conveyor 3. The cutting member will then remain in this lower position during another upward movement of the rotor which will draw more dough into the housing. Of course, the passageway below the housing must be filled with dough before the doughnuts can be formed but after the passageway becomes filled in this manner, each time the rotor is lowered a doughnut will be formed and this operation will continue so long as there is any dough in the reservoir. The dough may be placed in such reservoir continuously without having to dismember any of the mechanism.

On the other hand, the device is so constructed that the ejecting tube 21 and its associated parts including the cutting member may be completely removed from the rest of the machine for cleaning purposes and may be replaced without the necessity of removing any of the other parts of the device.

The machine has been found to operate successfully in practice and is economical both to manufacture and to operate because of the comparatively few mechanical parts involved.

Other modes of applying the principle of my invention may be employed instead of the one here explained changes being made as regards mechanism herein disclosed provided, however, that the means stated by any of the following claims or the equivalent of such stated means be employed.

I claim:

1. A dough feeding device comprising, a reservoir for holding an amount of dough, a housing adjacent said reservoir and communicating therewith, an ejector tube below and communicating with said housing, a plunger within said housing for movement to open and close communication between said housing and reservoir, and means to close said ejector tube when said plunger moves upwardly, whereby a suction is created within the housing to draw dough thereinto after said plunger has opened the communication between the housing and reservoir.

2. A dough feeding device comprising, a reservoir for holding an amount of dough, a housing adjacent said reservoir, a passageway between said reservoir and said housing, a plunger in said housing to open and close said passageway, a second passageway extending from said housing, a valve in said second passageway and means to operate said valve in timed relation with said plunger, whereby said valve is closed during the upward movement of said plunger and the opening of the first passageway to thereby create a suction to draw dough into the housing.

3. A dough feeding device comprising, a reservoir for holding an amount of dough, a housing adjacent said reservoir, a passageway between said reservoir and said housing, a plunger in said housing adjacent to and movable across said passageway to open and close same, an ejecting tube communicating with and extending from said housing, and means for closing the lower end of said tube on movement of said plunger to open said passageway thereby creating a suction within the housing to draw an amount of dough therein.

4. The combination of elements defined in claim 3 wherein said plunger has an oscillatory rotating movement.

5. A dough feeding device comprising, a reservoir for holding an amount of dough, a housing adjacent said reservoir, a passageway between said housing and reservoir, an oscillating rotor in said housing for opening and closing said passageway, a stationary partition in said housing, means for oscillating said rotor, a passageway leading from said housing through which the dough is to be ejected, and means for closing said second passageway when said rotor moves in the direction for opening the first passageway to thereby create a suction to draw dough from the reservoir into the housing.

6. The combination of elements defined in claim 5, combined with means to open said second passageway before said rotor reaches its lowest position, to thereby permit ejection of the dough therethrough.

GEORGE E. TUBBS.